(12) United States Patent
Watanabe

(10) Patent No.: US 6,402,419 B1
(45) Date of Patent: Jun. 11, 2002

(54) FASTENING MEMBER

(75) Inventor: Morimichi Watanabe, Aichi (JP)

(73) Assignee: Nichiha Corporation, Aichi (JP)

( * ) Notice: Subject to any disclaimer, the term of this patent is extended or adjusted under 35 U.S.C. 154(b) by 0 days.

(21) Appl. No.: 09/568,981

(22) Filed: May 11, 2000

(30) Foreign Application Priority Data

May 12, 1999 (JP) .......................... 11-131340
Aug. 5, 1999 (JP) .......................... 11-222735

(51) Int. Cl.[7] ................................ F04B 2/56
(52) U.S. Cl. ........................ 403/381; 248/220.22
(58) Field of Search .................. 248/231.9, 220.22, 248/223.41, 224.7; 403/381

(56) References Cited

U.S. PATENT DOCUMENTS 5,321,904 A * 6/1994 Benson ................ 248/223.4 X

FOREIGN PATENT DOCUMENTS

| JP | 09-203184 | | 5/1997 | |
|----|-----------|---|--------|---|
| JP | 10-148024 | | 6/1998 | |
| JP | 192575 | * | 12/1998 | ........... E04F/13/08 |
| JP | 213140 | * | 1/1999 | ........... E04F/13/08 |
| JP | 230304 | * | 12/1999 | ........... E04F/13/08 |

* cited by examiner

Primary Examiner—Lynne H. Browne
Assistant Examiner—John R. Cottingham
(74) Attorney, Agent, or Firm—Lowe Hauptman Gilman & Berner, LLP

(57) ABSTRACT

A fixture which is formed through a bending work of a single metallic plate, is used as a fastening member for siding boards. The fixture comprises a vertical substrate; a horizontal portion extended from the substrate; and an engaging portion formed at the tip portion of the horizontal portion. The horizontal portion includes a first horizontal member and a second horizontal member put together. The engaging portion includes a vertical flat plate member which is formed contiguous to the first and second horizontal members.

9 Claims, 9 Drawing Sheets

FASTENING MEMBER

BACKGROUND OF THE INVENTION

1. Field of the Invention

The present invention relates to a fixture to be employed as a fastening member for connecting boards such as siding boards to each other in a top and bottom relationship through a shiplap joint.

Recently, a large number of decorative siding boards having various surface patterns and designs are now employed in order to meet the consumer's demands for a more sophisticatedly designed external wall of housing.

In related arts, conventionally, the decorative siding boards are attached, via an underlayment using screws or nails, to the external wall of housing with the longitudinal direction of the siding boards being oriented in the horizontal or vertical direction. However, when the decorative siding boards are fastened using screws or nails, the decorative surface of the decorative siding boards may be damaged due to the screws or nails, thereby spoiling the decorative design of the siding boards.

2. Description of the Related Arts

In a prior art, with a view to overcome the aforementioned problems, a fixture 30 as shown in FIG. 5 has been proposed as a fixture (for example, Japanese Patent Unexamined Publication H9-203184). This fixture 30 comprises a substrate 31, a horizontal portion 32 perpendicularly projected from the substrate 31, an upwardly inclined hook portion 33A obliquely extended upward from the tip edge of the horizontal portion 32, and a downwardly inclined hook portion 33B obliquely extended downward from the tip edge of the horizontal portion 32. The fixture of this type is usually manufactured by means of the extrusion molding of aluminum in view of the moldability thereof.

As shown in FIG. 6, this fixture 30 (metallic fixture) is adapted to be fixed to an underlayment 61 by making use of screws 62 which are to be screwed into vis holes 34 formed in the substrate 31. In this case, four sides of the siding boards 40A and 40B constituting building boards to be connected together are respectively formed into a rabbeted portion for forming a shiplap connection. Specifically, the upper side and one lateral side of each siding board 40A or 40B are respectively formed into an underlying rabbeted portion, while the lower side and the other lateral side each siding board 40A or 40B are respectively formed into an overlying rabbeted portion. In the embodiment shown in FIG. 6, the lower side of the upper siding board 40A to be connected is formed into an overlying rabbeted portion, while the upper side of the lower siding board 40B is formed into an underlying rabbeted portion. This overlying rabbeted portion is provided with an overlying tongue pattern portion 41 constituting the front side of the overlying rabbeted portion, an overlying tongue engaging portion 42 constituting the rear side of the overlying rabbeted portion, and a groove portion 43 formed between the overlying tongue pattern portion 41 and the overlying tongue engaging portion 42.

On the other hand, the underlying rabbeted portion thereof is formed at the upper side of the siding board arranged below, covered by the overlying tongue pattern portion 41, and consisted of an underlying tongue engaging portion 44 being attached to the metallic fixture 30.

The installation of the siding boards can be performed as follows. First of all, the tip edge portion of the underlying tongue engaging portion 44 of a lower siding board 40B is fitted in the lower engaging portion 50B (which is formed by a substrate 31, a horizontal portion 32 and a downwardly inclined hook portion 33B) of the metallic fixture 30 which has been attached in advance to the underlayment 61, thereby fixing the lower siding board 40B to the underlayment 61.

Then, the overlying tongue engaging portion 42 of an upper siding board 40A is fitted in the upper engaging portion 50A (which is formed by a substrate 31, a horizontal portion 32 and an upwardly inclined hook portion 33A) of the metallic fixture 30, thereby fixing the upper siding board 40A to the underlayment 61. Since the upper siding board 40A and the lower siding board 40B are connected each other in this manner, there is little possibility that the surfaces of these siding boards are damaged as in the case of fastening with screws or nails, and at the same time, the existence of the metallic fixture 30 cannot be externally recognized, thus making it possible to provide a very preferable external appearance of board siding.

There is also known, as another type of a fixture, a structure shown in FIG. 9. Namely, this fixture 70 is formed of a single piece of metal plate which has been bent into a prescribed configuration. Namely, one end portion of a metal plate 71 is horizontally bent thereby to form a first horizontal portion 72, the tip portion of which is further obliquely bent upward, thereby forming an upwardly inclined engaging portion 73. Further, the other portion of a metal plate 71 is horizontally bent thereby to form a second horizontal portion 74, the tip portion of which is further bent downward, thereby forming a downwardly inclined engaging portion 75. The first horizontal portion 72 and the second horizontal portion 74 are disposed to face each other, leaving a slight gap C therebetween, thus permitting the upwardly inclined engaging portion 73 and the downwardly inclined engaging portion 75 to be moved independently without interfering with each other (see Japanese Patent Unexamined Publication H10-148024).

This fixture 70 can be employed in the same manner as that shown in FIGS. 5 and 6. However, since the entire body of the fixture 70 is constructed through a bending work of a single metal plate 71, it exhibits a higher resistance to bending or breakage as compared with that manufactured by the extrusion molding of an aluminum material. Furthermore, since the horizontal portion thereof is constituted by a couple of horizontal portions, i.e. the first horizontal portion 72 and the second horizontal portion 74, any deformation due to the weight of siding boards to be fastened can be advantageously prevented to some extent.

By the way, FIG. 7 shows a siding board 40 as viewed from the front surface side thereof (the side to which a design is applied), the siding board 40 being provided with underlying rabbeted portions at the top side and the right side thereof and with overlying rabbeted portions at the bottom side and left side thereof. More specifically, an underlying tongue engaging portion 44A is formed horizontally at the top side of the siding board 40, while an underlying tongue engaging portion 44B is formed perpendicularly at the right side of the siding board 40. A caulking agent 45A or 45B is coated on a front surface portion of each of the underlying tongue engaging portions 44A and 44B, which is spaced apart by a predetermined distance from the inner corner portion of each of the underlying tongue engaging portions 44A and 44B.

FIG. 8 is a perspective view illustrating partially a connected state of siding boards shown in FIG. 7 which are connected in the vertical direction. In this case, the overlying rabbeted portion formed at the bottom side of the upper siding board 40A is fittingly shiplap-connected with the underlying rabbeted portion formed at the top side of the lower siding board 40B. On this occasion, a gap Sl is formed between these siding boards 40A and 40B. Further, a number of the siding boards are designed to be laterally placed on both sides (right and left sections) of the these siding boards 40A and 40B. In this case, the overlying tongue pattern portion 41A formed perpendicularly at the left side of the siding board is fittingly connected with the underlying tongue engaging portion 44B formed at the right side of the upper siding board 40A (and of the lower siding board 40B). On this occasion, a gap S2 is also formed perpendicularly between these siding boards. As seen from FIG. 8, the gap S1 extending horizontally becomes contiguous with the gap S2 extending vertically.

There is much possibility that rain water may leak into these gaps S1 and S2. However, since the caulking agent 45A applied to the front surface portion of the underlying tongue engaging portion 44A of the top side of the lower siding board 40B is caused to contact with the rear surface of the overlying tongue pattern portion 41A of the bottom side of the upper siding board 40A so as to form a sealing portion, it is possible to prevent the rain water that has been entered into the horizontal gap S1 from flowing vertically into the rear surface side of the siding board 40. Likewise, it is also possible to prevent the rain water that has been entered into the vertical gap S2 from flowing laterally into the rear surface side of the siding board 40.

On the other hand, the rain water that has been entered into the horizontal gap S1 is caused to move horizontally to reach the vertical gap S2 and to flow downward through this vertical gap S2. By the way, as shown in FIG. 6, although the metallic fixture 30 is disposed at the junction between the siding boards 40, since the inner surface of the upwardly inclined hook portion 33A of the metallic fixture 30 is closely contacted with the inclined surface of the overlying tongue engaging portion 42 of the upper siding board 40A, there is little possibility that the rain water flowing downward through the vertically extending gap S2 may leak into the-interior of the upper engaging portion 50A (a trace amount even if there is any leakage), so that the rain water is possibly caused to flow downward after passing over the top side of the upwardly inclined hook portion 33A, thereby possibly allowing the rain water to enter into the space Sa having a triangular cross-section, which is encircled by the front surface of the upwardly inclined hook portion 33A, the front surface of the downwardly inclined hook portion 33B and the rear surface of the overlying tongue pattern portion 41 of the upper siding board 40A.

As mentioned above, since a seal portion is formed between the rear surface of the overlying tongue pattern portion 41A of the bottom side of the upper siding board 40A and the front surface of the underlying tongue engaging portion 44A of the upper side of the lower siding board 40B, the rain water that has been entered into the space Sa having a triangular cross-section as mentioned above is caused to temporarily retain inside the space Sa without immediately flowing downward from the space Sa. The rain water retaining inside the space Sa is caused to move right and left, and then leaks out from the side edges of the hook portions 33A and 33B, thereby causing the rain water to flow into a space which is formed higher than the caulking agent 45A that has been applied horizontally to the front surface of the underlying tongue engaging portion 44A of the upper side of the lower siding board 40B. Even if the rain water is leaked into the upper engaging portion 50A, the rain is also caused to leak out from the side edges of the hook portions 33A and 33B or of the horizontal portion 32, thereby causing the rain water to flow into the aforementioned space. Since this space is communicated with the rear side of the siding board 40, the rain water leaked into the space is allowed to enter into the rear side of the siding board 40, thus damaging the siding boards.

The same phenomenon as mentioned above can happen in the case of the fixture 70 shown in FIG. 9. Namely, the rain water flowing down into the space Sx formed by the upwardly inclined engaging portion 73, the tip portion of the second horizontal portion 74 and the downwardly inclined engaging portion 75 is caused to retain inside the space Sx and then, is allowed to enter into the rear side of the siding board 40, thus damaging the siding boards. Further, since the fixture 70 is constructed through a bending work of a single metal plate, it exhibits a higher resistance to bending or breakage as compared with a molded product manufactured by the extrusion molding of an aluminum material as shown in FIG. 5. Furthermore, although the horizontal portion thereof is also resistive to a bending moment (vertical load), a gap is caused to be formed between the first horizontal portion 72 and the second horizontal portion 74, so that a deformation corresponding to the magnitude of the gap C may be inevitably generated in the first horizontal portion 72 due to the weight of the siding board to be fastened. Because of this, it is absolutely necessary to distribute the weight of a siding board (or a building board) to be fastened by keeping a certain lateral width of the fixture.

SUMMARY OF THE INVENTION

Therefore, an object of the present invention is to overcome aforementioned problems that may be encountered in the case of the conventional fixture, and more specifically, to provide an improved fixture which is capable of positively preventing rain water from leaking into the rear side of the siding board, and at the same time, capable of suitably sustaining the load of siding boards by a horizontal portion of the fixture, which is increased in resistance against the vertical load and is formed to have a relatively short lateral width, thereby making the fixture compact in configuration having a relatively short lateral width.

Another object of the present invention is to provide a compact fixture which makes it possible to reduce the manufacturing cost thereof in terms of raw material cost, to facilitate the fastening of siding boards, and to stabilize the fixture to an underlayment reliably.

With a view to realize the aforementioned objects, the present invention provides a fixture for siding boards which comprises;

a substrate; a horizontal portion extended from the substrate; and an engaging portion formed at the tip portion of said horizontal portion; which is characterized in that;

said horizontal portion and said engaging portion are integrally formed through a bending work of a single plate contiguous to said substrate, and constituted at least by a first horizontal member, a vertical flat plate member contiguous to said first horizontal member, and a second horizontal member contiguous to said vertical flat plate member, said first horizontal member being piled on said second horizontal member.

In the case of the fixture according to the present invention, the rain water flowing downward through the vertical gap S2 may overflow passing over the upper edge of the vertical flat plate member, and then, flow downward along the front surface of the vertical flat plate member. Otherwise, the rain is caused to temporarily retained in a small gap formed between said vertical flat plate member and the rear surface of said siding board, thus being kept therein in an immobilized state and prevented from further entering into the gap, all of the rain thus retained is finally discharged toward the front surface of said siding board. Therefore, the rain water that has been entered through the horizontal and vertical gaps can be reliably prevented from leaking into the rear side of the siding board.

Further, the aforementioned horizontal portion and engaging portion are continuously formed through a bending work of a single plate constituting the substrate, and the first horizontal member and the second horizontal member are put together, the tip ends thereof being formed integral with the vertical flat plate member. By the way, these first horizontal member and second horizontal member may be integrally fused together by means of spot welding for instance thereby forming a piled constructure. Since the horizontal portion is constructed in this manner, the horizontal portion can be made highly resistive to the bending moment to be generated by a vertical load on the horizontal portion (the load of siding board to be fastened, which mainly acts on the upper edge portion of the vertical flat plate member), thus preventing the horizontal portion from being deformed. Furthermore, it becomes possible to fully sustain the load of siding board to be fastened even if the area of the horizontal portion is relatively small, thus making it possible to maintain a stabilized fastened state of siding boards even if the lateral width of the horizontal portion is relatively short.

As a result, the fixture can be made compact in configuration having a relatively short lateral width, thus enabling to reduce the manufacturing cost thereof in terms of raw material cost. Thus greatly alleviating the restrictions accompanied with the installation of siding boards.

According to a preferable embodiment of this fixture, the tip end of the first horizontal member is made contiguous with the vertical flat plate member through a first inclined plane extending obliquely upward from the tip end of the first horizontal member, and likewise, the tip end of the second horizontal member is made contiguous with the vertical flat plate member through a second inclined plane extending obliquely downward from the tip end of the second horizontal member, thereby forming a closed triangular space in cross-section between the tip ends of the first and second horizontal members and the vertical flat plate member. According to this embodiment, an upper siding board and a lower siding board can respectively be fastened with their shiplap connections being engaged with the vertical flat plate member and the first and second inclined planes of the fixture, thereby further stabilizing the fastened state of siding board. Additionally, since the engaging portion is constituted by a closed triangular space in cross-section, the total weight of the fixture would not be so increased, and at the same time, the resistance of the fixture to the aforementioned bending moment can be further enhanced.

Further, according to another preferable embodiment of this fixture, the substrate is featured in that it is provided with an upstanding portion at the upper edge and at the lower edge thereof, these upstanding portions being projected backward from the rear surface of the substrate, and that it is also provided with a recessed portion, which is projected rearward from the rear surface of the substrate and provided at the bottom thereof with a screw hole. As a result, an air flow passageway can be easily formed between the siding board fastened and an underlayment attached to the building frame, thus making it possible to easily prevent the generation of condensation.

These upstanding portions as well as the recessed portion projecting rearward act to further increase the toughness of the fixture, and to enhance the resistance to the bending or twisting of the fixture, thus making it possible to obtain a fixture having a desired toughness even through the entire size thereof is relatively compact.

According to another preferable embodiment of this fixture, the substrate is provided at a portion located below the horizontal portion with a cut and raised portion projected toward the engaging portion. This cut and raised portion acts as an urging means for pressing the back surface of the siding board to prevent slipping. By the provision of this cut and raised portion, the fastening between the siding board and the fixture can be further stabilized. This cut and raised portion can be formed by a process wherein a predetermined portion of the substrate is cut to form a cut portion which corresponds to two sides of a desired triangular configuration for instance, and then, this cut portion is bent to form the cut and raised portion. More preferably, a cantilever-like cut portion is formed at first in the substrate, and then, a portion of this cantilever-like cut portion is bent toward the engaging portion of the fixture, thereby forming the cut and raised portion. The cut and raised portion of this type is easy to work and has a cantilever-like configuration as a whole, it can provide a more stable urging force. More preferably, this cut and raised portion is formed respectively on the right and left sections of the substrate and bent in symmetric and obliquely upward directions. When cut and raised portions are formed in this manner, these cut and raised portions act as an anti-slipping member so as to reliably prevent the siding board from being shifted in the lateral (rightward or leftward) direction.

The specification includes part or all of the contents disclosed in the specification and/or drawings of Japanese Patent Applications Nos. 11-131340 and 11-222735, which are priority applications of the present application.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
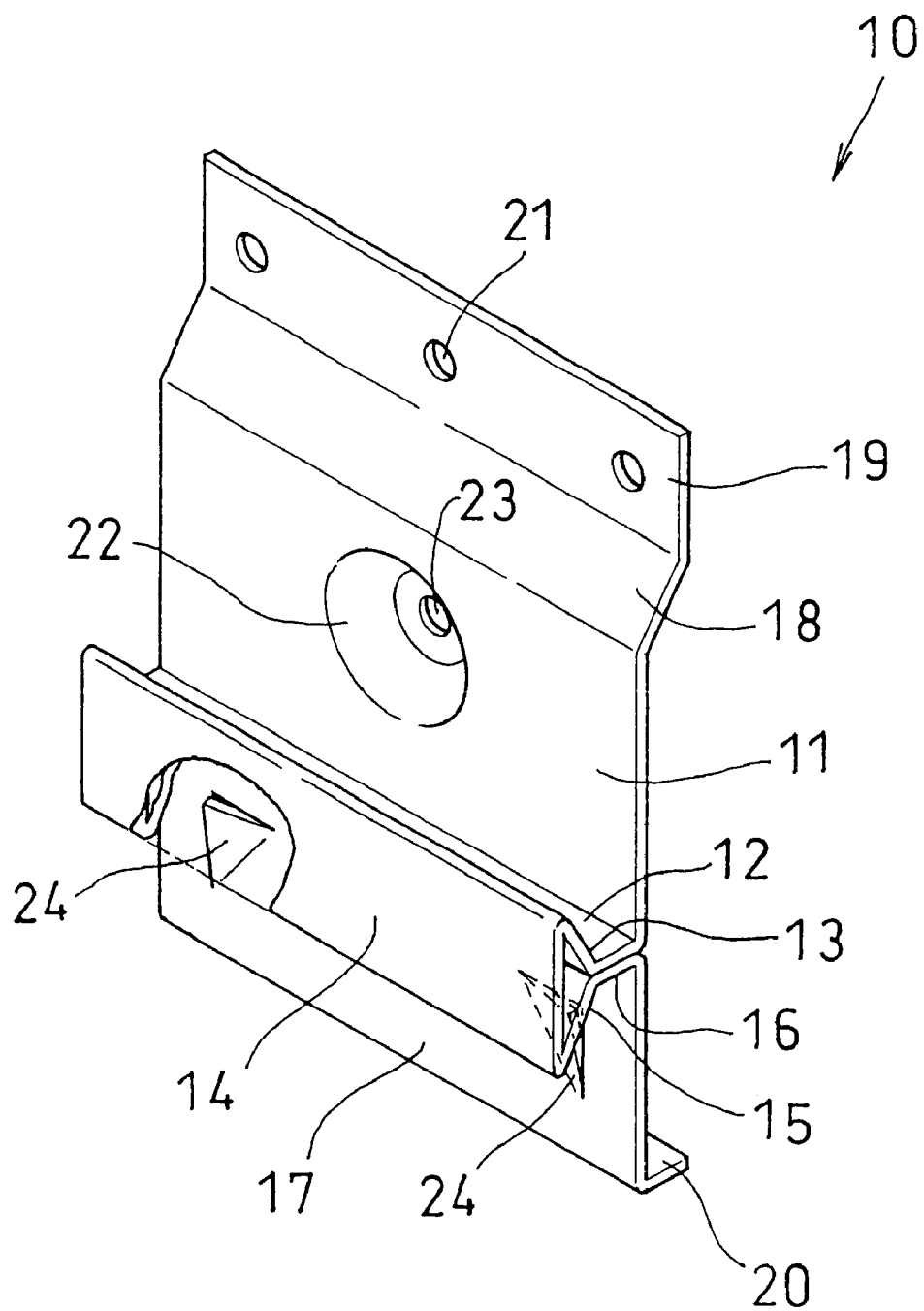
FIG. 1 is a perspective view illustrating a fixture representing one embodiment of the present invention.

Preferable embodiments of the fixture according to the present invention will be explained in details below with reference to the drawings, wherein like reference numerals designate identical or corresponding parts throughout the several views.

FIG. 1 shows a perspective view illustrating one embodiment of the fixture according to the present invention. This fixture is formed of a rectangular metal plate made of iron or stainless steel for instance and made into a prescribed configuration through a continuous bending work. The fixture 10 in this embodiment comprises a first substrate portion 11, a first horizontal member 12 which is formed through bending of the first substrate portion 11 by an angle of about 90 degrees to cause the first horizontal member 12 to extend horizontally from the first substrate portion 11, a first inclined plane 13 which is formed through bending of the tip end of the first horizontal member 12 in an obliquely upward direction, a vertical flat plate member 14 which is formed through bending of the tip end of the first inclined plane 13 in a perpendicularly downward direction, a second inclined plane 15 which is formed through bending of the lower end of the vertical flat plate member 14 in an obliquely upward direction, a second horizontal member 16 which is formed through bending of the upper edge portion of the second inclined plane 15 in the horizontal direction, and a second substrate portion 17 which is formed through bending of the rear end of the second horizontal member 16 in the vertical downward direction.

Figure 5:
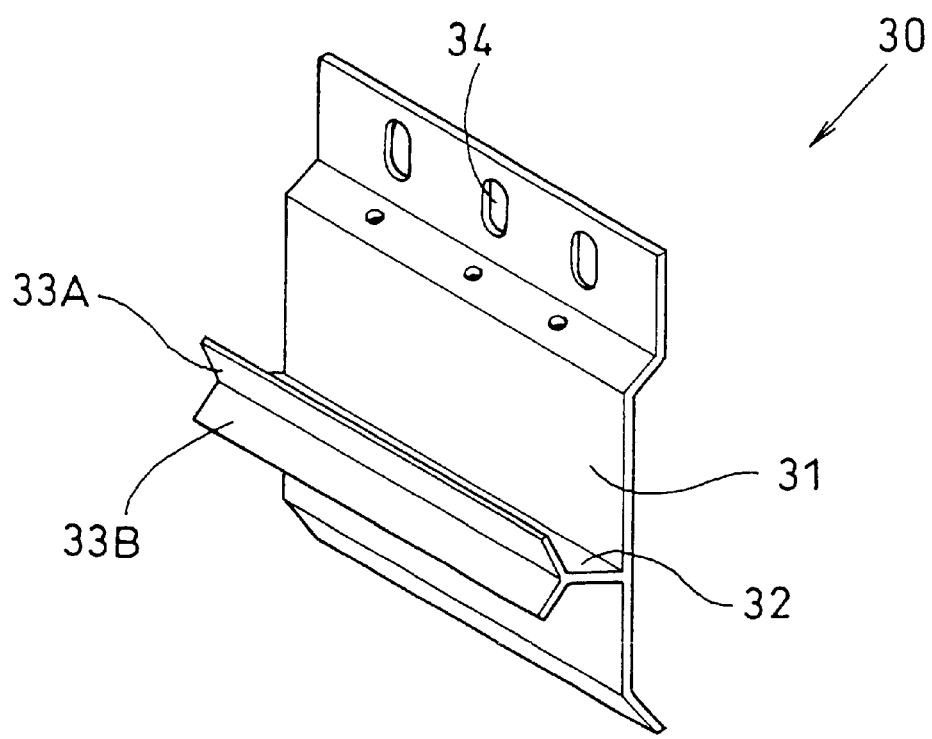
FIG. 5 is a perspective view illustrating a fixture according to the prior art.

As shown in FIG. 1, the first substrate portion 11 and the second substrate portion 17 are substantially flush with each other in the vertical direction, thereby constituting the substrate of the fixture 10 (corresponding to the substrate 31 in the conventional fixture 30 shown in FIG. 5). Further, the first horizontal member 12 and the second horizontal member 16 are substantially the same in width, and substantially put together to form a piled structure. This portion corresponds to the horizontal member 32 of the conventional fixture 30 shown in FIG. 5, thus constituting the horizontal portion perpendicularly extended from the substrate.

Further, the first inclined plane 13 and the second inclined plane 15 which are formed contiguous respectively to the first horizontal member 12 and the second horizontal member 16 and are inclined opposite to each other, thus being gradually spaced away from each other (which are equivalent to the upwardly inclined hook portion 33A and downwardly inclined hook portion 33B of the conventional fixture 30 shown in FIG. 5), constitute, together with the vertical flat plate member 14, a closed triangular space in cross-section, thus constituting an engaging portion at the tip end of the horizontal portion. Although not shown in the drawing, the first horizontal member 12 and the second horizontal member 16 may be integrally fuse-bonded by means of spot welding. Further, an upstanding portion 18 inclined rearward and a third substrate portion 19 are successively formed on the top of the first substrate portion 11, while an upstanding portion 20 bent rearward by an angle of 90 degrees is formed contiguous with the lower end of second substrate portion 17. The third substrate portion 19 is provided with a nailing hole 21 to be utilized for nailing the siding board to an underlayment 61 (for example, a furring strip) of a building frame. In this case, the length of the upstanding portion 20 is substantially equivalent to the distance between the first substrate portion 11 and the third substrate portion 19.

Additionally, a recessed portion 22 which is recessed rearward is integrally formed at approximately the central portion of the first substrate portion 11, and is provided in the bottom thereof with a screw hole 23. The depth of the recessed portion 22 is approximately identical with the plane connecting the tip end of the upstanding portion 20 with the third substrate portion 19. As shown in FIG. 1, a couple of triangular cut and raised portions 24, each being formed by a cut portion constituting two sides of a triangular configuration and by the bending of the cut portion, are formed on the right and left sections of the second substrate portion 17 with the bending direction of these cut and raised portions being symmetric and obliquely upward.

Figure 2:
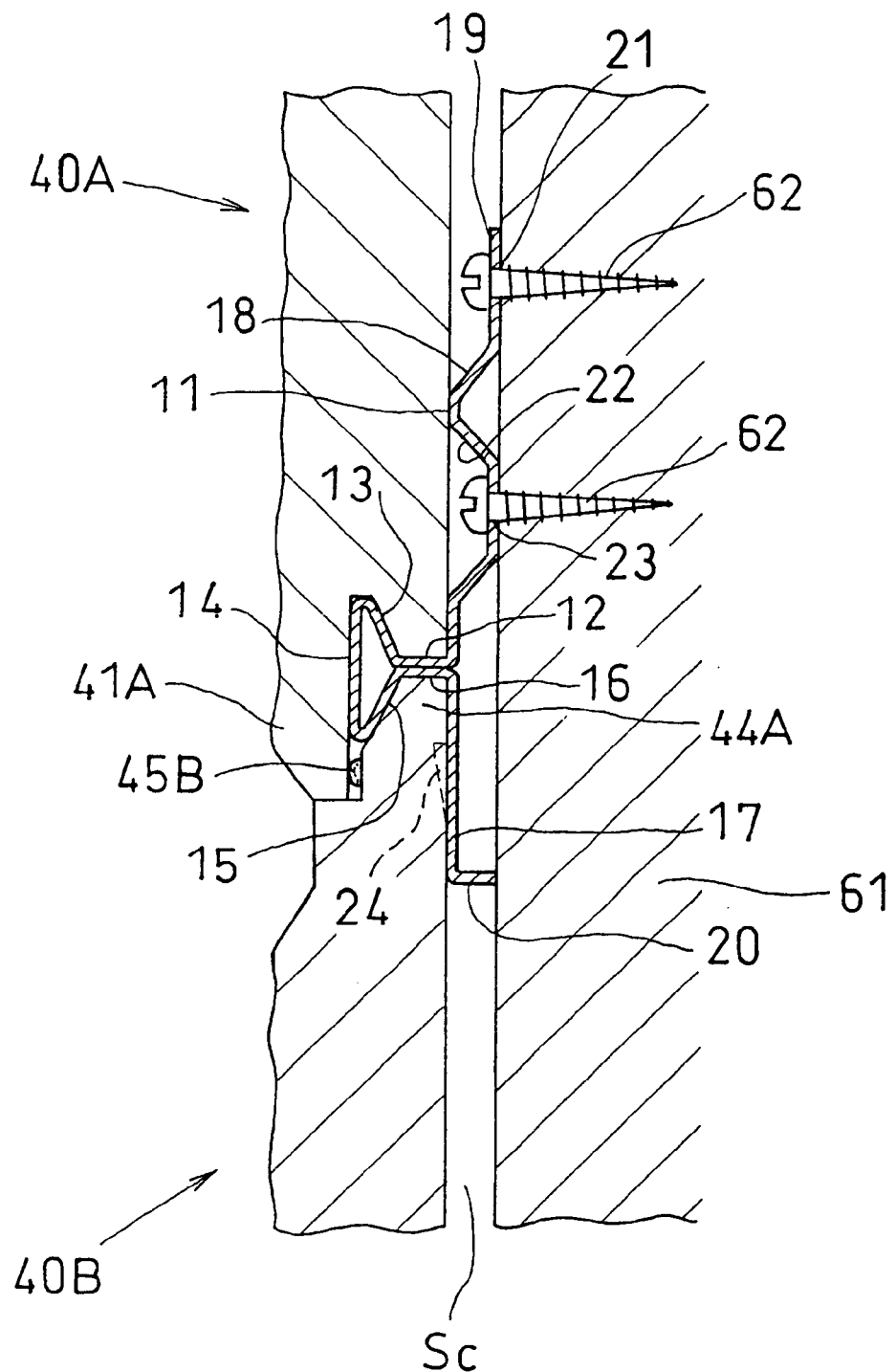
FIG. 2 is a longitudinal sectional view illustrating the manner of using the fixture shown in FIG. 1.
Figure 3:
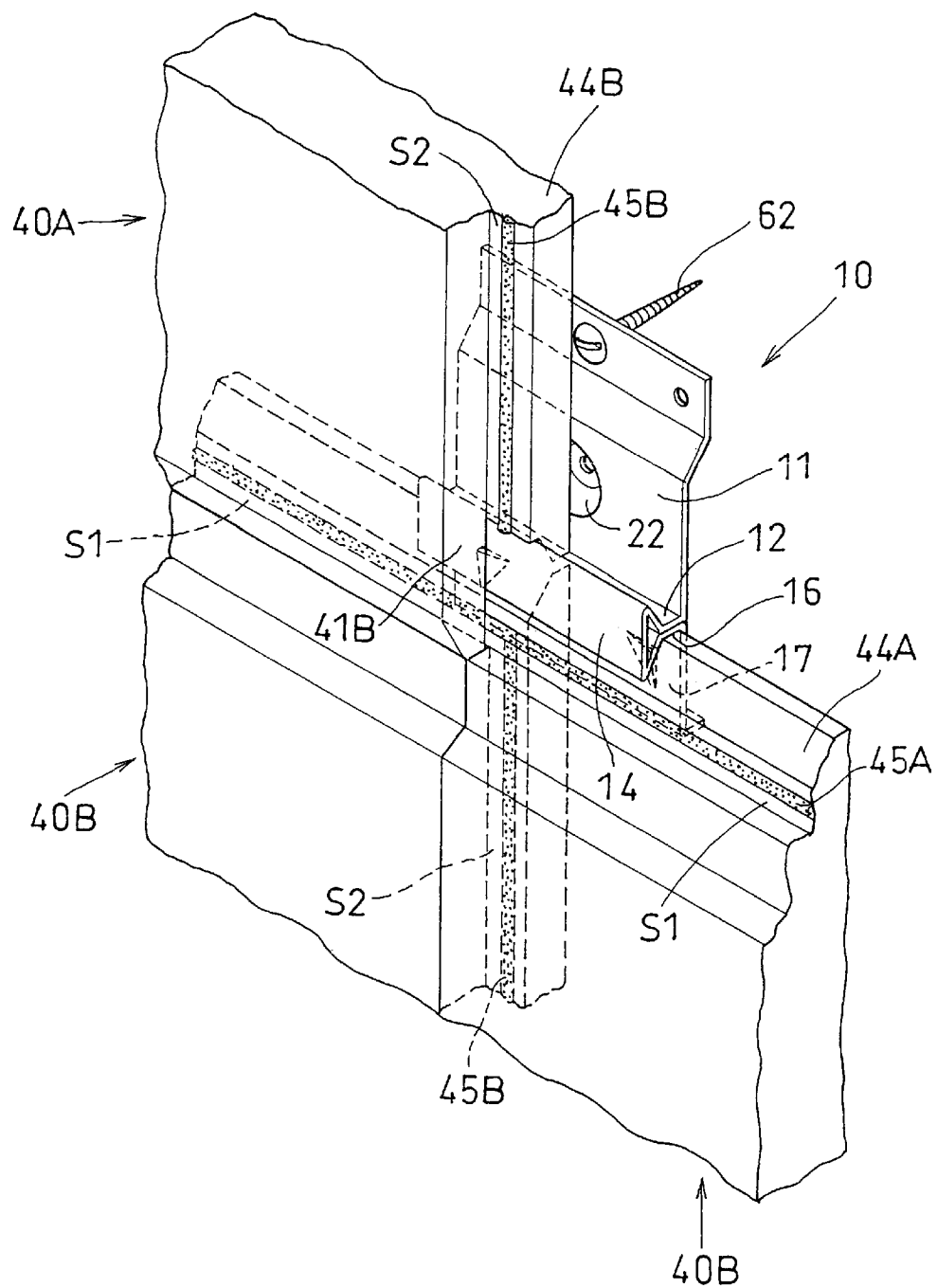
FIG. 3 is a perspective view illustrating the manner of using the fixture shown in FIG. 1.
Figure 6:
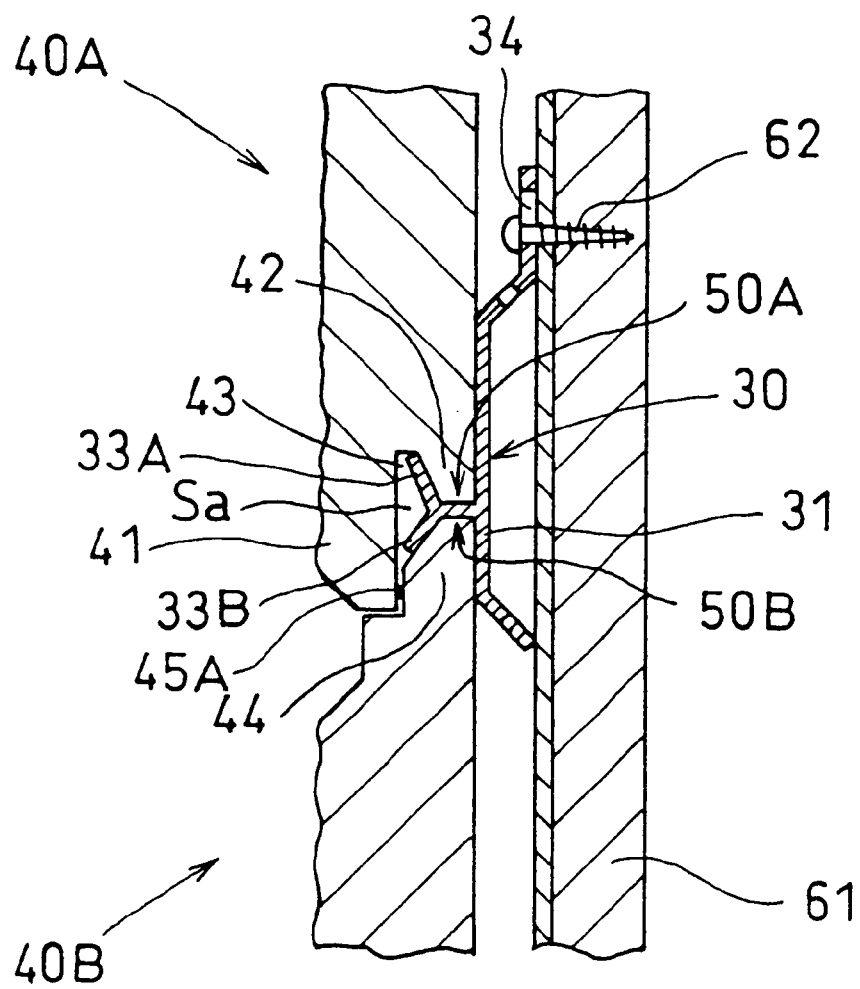
FIG. 6 is a longitudinal sectional view illustrating the manner of using the fixture shown in FIG. 5.
Figure 7:
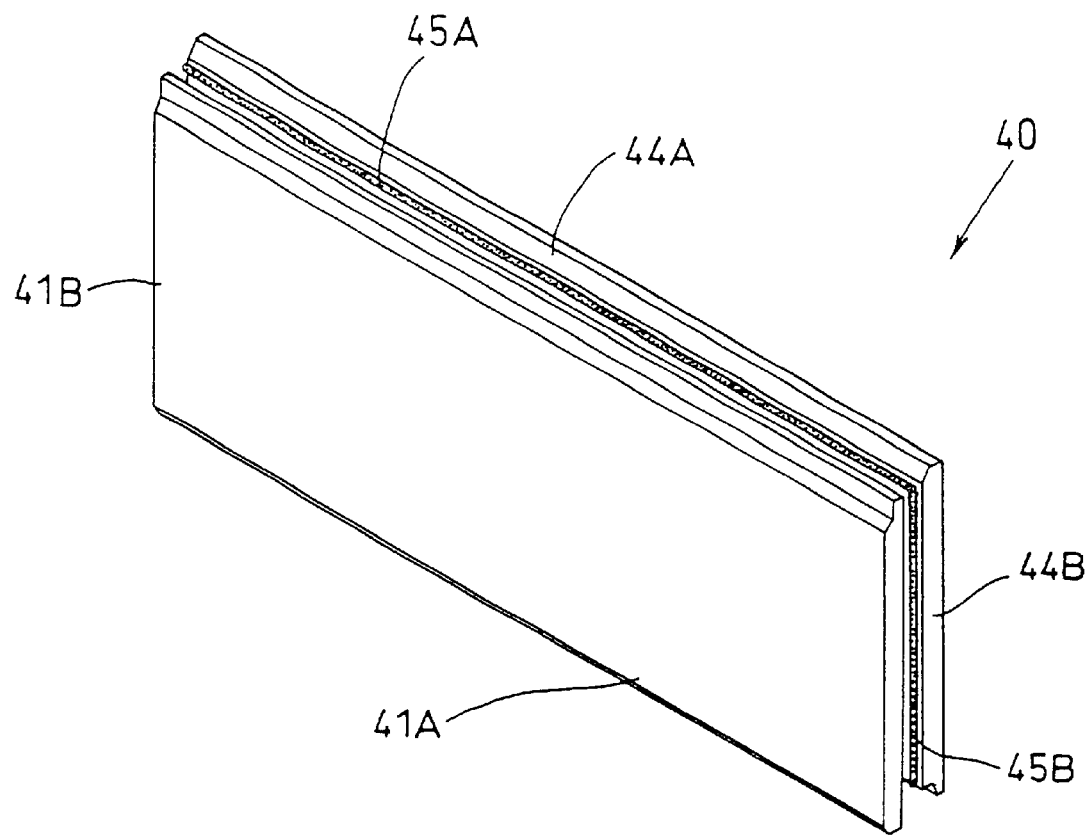
FIG. 7 is a perspective view illustrating one example of siding board.
Figure 8:
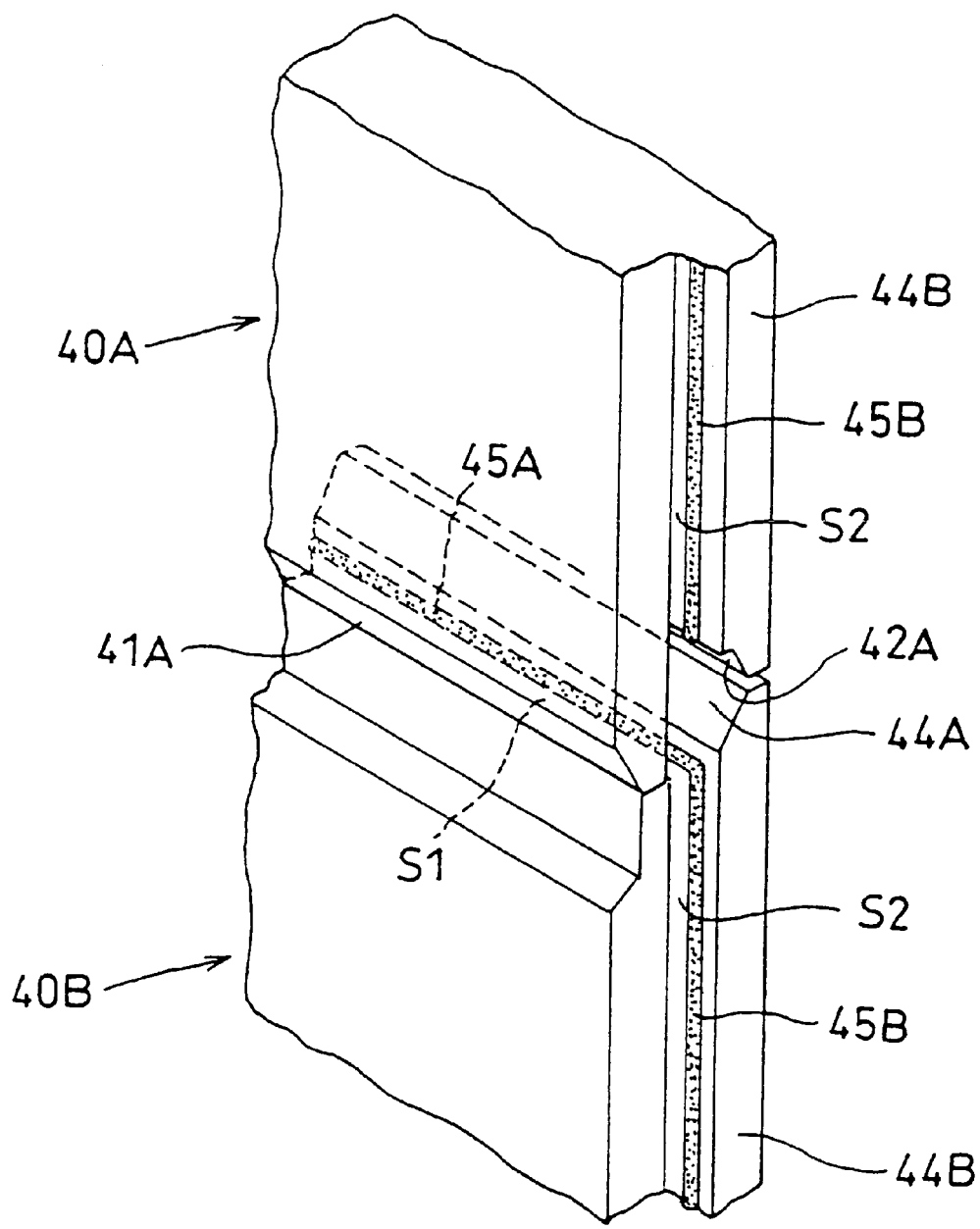
FIG. 8 is a perspective view illustrating the manner of installing the siding boards shown in FIG. 7.
Figure 9:
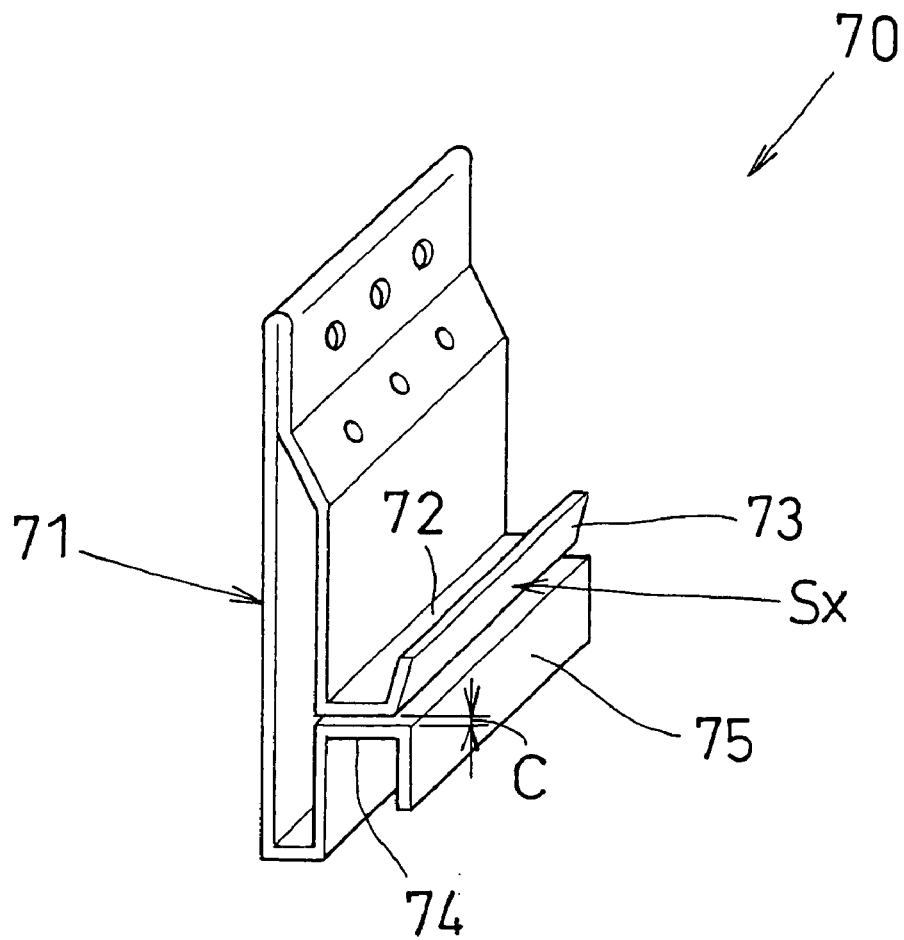
FIG. 9 is a perspective view illustrating another example of fixture according to the prior art.

FIGS. 2 and 3 illustrate a fastened state of the siding boards 40 shown in FIG. 7 which are installed by making use of the fixture 10. Specifically, these siding boards 40A and 40B are fastened in the same manner as illustrated with reference to FIGS. 6 and 8. The relationship between these siding boards 40A and 40B in the fastened state thereof is the same as illustrated with reference to FIGS. 6 and 8. Therefore, the same members as indicated in FIGS. 6 and 8 are identified by the same reference numerals thereby to omit the detailed explanation thereof.

As shown in FIG. 2, in the case of this fixture 10, the portion extending forward from the first inclined plane 13 and the second inclined plane 15 is constituted by the vertical flat plate portion 14, so that when the siding board 40 is fastened, this flat plate portion 14 is kept contacted with the rear surface of the overlying tongue pattern portion 41A of the upper siding board 40A. Therefore, there is no possibility of creating the space Sa of triangular cross-section as shown in FIG. 6, so that the rain water flowing downward through the vertical gap S2 formed between the right and left siding boards is caused to temporarily retained in a small gap formed between the vertical flat plate member 14 and the rear surface of said siding board, thus being kept therein in an immobilized state and prevented from further entering into the gap, all of the rain thus retained being finally discharged toward the front surface of said siding board. Therefore, the rain water can be reliably prevented from leaking into the rear side of the siding board.

Since these first horizontal member 12 and second horizontal member 16 are put together in this manner and the vertical flat plate portion 14 is integrally attached to the tip end side of these horizontal members 12 and 16, the horizontal portion can be made highly resistive to the load of the siding board 40A which is to be mainly imposed on the upper edge of the vertical flat plate portion 14. As a result, it becomes possible to fully sustain the load of siding board to be fastened even if the area of the horizontal portion is relatively small, thus making it possible to maintain a stabilized fastened state of siding boards even if the lateral width of the horizontal S portion (i.e. the lateral width of the fixture 10) is relatively short.

As a result, it becomes possible to reduce the manufacturing cost thereof in terms of raw material cost. Thus increasing execution methods of fastening the fixture to the underlayment and hence, greatly alleviating the restrictions accompanied with the installation of siding boards.

A couple of cut and raised portions 24,24 are formed as an urging means on the second substrate portion 17 so as to press the siding board 40 to prevent slipping, so that the fastening between the siding board 40 and the fixture 10 can be further stabilized. Moreover, since these cut and raised portions 24,24 are formed in such a manner that the bending directions thereof are symmetric and obliquely upward, it is possible to effectively prevent the siding board 40 from being shifted in the lateral (rightward or leftward) direction.

The first substrate portion 11 is provided at the upper portion thereof with an upstanding portion 18 which is extended rearward, while the second substrate portion 17 is provided at the lower portion thereof with an upstanding portion 20 which is also extended rearward, thereby forming an air flow passageway Sc (see FIG. 2) between the siding boards 40 being fastened and the underlayment 61. As a result, it is possible to prevent the generation of condensation on the rear surface of the siding boards 40.

As described above, the first substrate portion 11 is provided on the rear side thereof with the recessed portion 22, which functions together with the upstanding portions 18 and 20 to enhance the toughness of the fixture 10. Even with this construction, it is possible to obtain the fixture 10 having a desired toughness even if the fixture 10 is relatively small in size as a whole. Further, as shown in FIG. 2, since the attachment of fixture 10 to the underlayment 61 of the building frame can be effected also by making use of the vis hole 23 formed in the recessed portion 22, it is now possible to obtain a more stabilized fastened state as compared with the conventional fixture which can be nailed mainly only through the third substrate portion 19.

Figure 4:
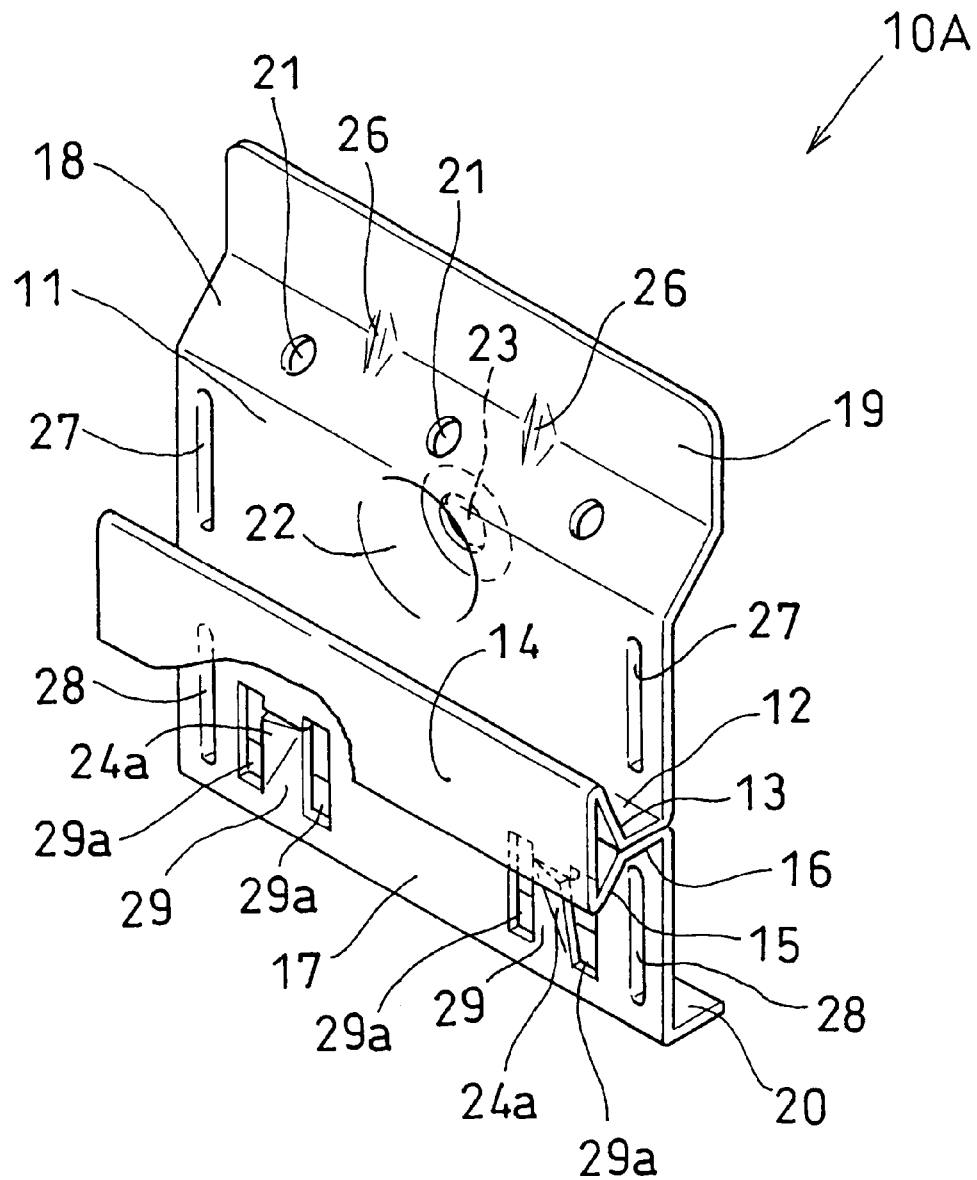
FIG. 4 is a perspective view illustrating a fixture representing another embodiment of the present invention.

FIG. 4 shows another embodiment of the fixture according to the present invention. This fixture 10A is the same as the fixture 10 which has been explained with reference to FIG. 1 as far as the main structure thereof is concerned, so that the members having the same function as those shown in FIG. 1 are identified by the same reference numerals. Accordingly, only the features which differ from those of the fixture 10 will be explained.

First of all, according to this embodiment, the nailing holes 21 are formed not in the third substrate portion 19, but in the inclined upstanding portion 18. As a result, the fixture can be pressed obliquely downward, thus permitting the fixture to be nailed to the underlayment of the building frame. With a view to enhance the toughness, ribs 26 are vertically formed between the inclined upstanding portion 18 and the third substrate portion 19. Additionally, with a view to enhance the toughness of the substrate portion, a couple of U-shaped grooves 27 and 28 each extending in the vertical direction are formed on both sides of the first substrate portion 11 and of the second substrate portion 17, respectively.

A couple of rectangular cantilever portions 29,29 each of which is formed from a cantilever-like cut with the upper portion thereof being constituted by a free end are formed on the right and left sections of the second substrate portion 17. The tip end portions of the cantilever portions 29,29 are bent in symmetric and obliquely upward directions, thereby respectively forming a triangular cut and raised portion 24a which is projected toward the engaging portion. On both sides of the rectangular cantilever portion 29, a rectangular hole 29a is respectively formed. The cut and raised portion 24a according to this embodiment is featured in that, in addition to the effect of preventing a siding board from shifting in the lateral direction, the working thereof would become easy since the rectangular holes 29a are formed on both sides of the cantilever portion 29, and a more stabilized urging force can be ensured since the entire structure thereof is formed in a cantilever-like structure. Although the cut and raised portion is formed only on the second substrate portion 17 in the aforementioned embodiment, the cut and raised portion can be formed also on the first substrate portion 11. In this case, the cantilever 29 should be formed in such a manner that the lower end thereof becomes a free end.

According to the fixture of the present invention, the rain water flowing downward through the vertical gap between the right and left siding boards can be reliably allowed to flow toward the front surface of the siding board due to the existence of this fixture. Therefore, the retention of rain water in the vicinity of the engaging portion of the fixture that has been frequently occurred in the conventional fixture can be prevented, thus making it possible to prevent rain water from leaking into the rear side of the siding board.

Further, since the entire structure of the fixture is formed through a bending work of a single plate, and in particular, since the horizontal portion thereof is constituted by a piled structure of a couple of metal plates (if desired, fuse-bonded by means of spot welding), the tip ends thereof being formed integral with the vertical flat plate member, the horizontal portion can be made highly resistive to the bending moment to be imposed by a vertical load on the horizontal portion, thus preventing the horizontal portion from being easily deformed. Therefore, it becomes possible to fully sustain the load of siding board to be fastened even if the area of the horizontal portion is relatively small. As a result, the fixture can be made compact in configuration having a relatively short lateral width, thus enabling to reduce the manufacturing cost thereof in terms of raw material cost and greatly alleviating the restrictions accompanied with the installation of siding boards.

Further, since the fixture is provided with the upstanding portion as well as with the recessed portion, the resistance to twisting or compression can be increased, thus increasing the toughness thereof, so that the fixture can be made more compact as a whole. Further, since the fixture is provided with the cut and raised portion as an urging means to prevent slipping, the siding board does not easily shift in the lateral direction.

All publications including patents and patent applications cited herein are incorporated herein by reference in their entireties.

What is claimed is:

1. A fixture for installing siding boards, said fixture being formed through a bending work of a single plate and comprising a vertical substrate, a horizontal portion extending frontward from the substrate, and an engaging portion formed at a distal end portion of said horizontal portion;

wherein said horizontal portion and said engaging portion are contiguous to said substrate and comprise at least a first horizontal member, a vertical flat plate member contiguous to said first horizontal member, and a second horizontal member contiguous to said vertical flat plate member with said first horizontal member being piled on said second horizontal member;

a distal end of the first horizontal member is made contiguous with the vertical flat plate member through a first inclined member extending obliquely upward from the distal end of the first horizontal member;

a distal end of the second horizontal member is made contiguous with the vertical flat plate member through a second inclined member extending obliquely downward from the distal end of the second horizontal member; and the first and second inclined members and the vertical flat plate member together define a space of a substantially triangular cross-section.

2. The fixture according to claim 1, further comprising upstanding portions projecting backward from upper and lower edges a rear surface of the substrate, and a recessed portion having side walls projecting rearward from the rear surface of the substrate and a bottom provided with a screw hole.

3. The fixture according to claim 1, wherein the substrate is provided with at least one cut-and-raised portion projected toward said engaging portion.

4. The fixture according to claim 3, wherein said at least one cut-and-raised portion is formed respectively on the right and left sections of the substrate and bent in symmetric and obliquely upward directions.

5. The fixture according to claim 3, wherein said at least one cut and raised portion is formed as a cantilevercut portion, a part of which is bent toward the engaging portion of the fixture.

6. The fixture according to claim 1, wherein said first horizontal member and the second horizontal member are at least partially fuse-bonded to each other.

7. A metallic fixture for siding boards, said fixture being formed through a bending work of a single plate and comprising:

a substrate part adapted to be fixed to an exterior wall, comprising: a first vertical plate, an inclined plane member extending downward and frontward from a lower edge of the first vertical plate, a second vertical plate extending downward from a lower edge of the inclined plane member, and a horizontal plate extending rearward from a lower edge of the second vertical plate to an imaginary plane containing the first vertical plate, and an engaging part adapted to be engaged with edge portions of the siding boards, comprising: a first horizontal member extending frontward from a predetermined position of the second vertical plate, a first inclined plane member extending frontward and upward from a front edge of the first horizontal member, a vertical flat plate member extending downward from a front edge of the first inclined plane member, a second inclined plane member extending rearward and upward from a lower edge of the vertical flat plate member, and a second horizontal member extending from a rear edge of the second inclined plane member to the predetermined position of the second vertical plate.

8. The metallic fixture according to claim 7, wherein a plurality of nailing holes are provided in at least one of the first vertical plate and the inclined plane member, and wherein a recessed portion, having side walls projecting rearward and a vis hole at a bottom thereof, is provided in the second vertical plate.

9. The metallic fixture according to claim 7, wherein a pair of symmetrical frontward projecting cut-and-raised portions is provided in a lower part of the second vertical plate.

* * * * *